June 30, 1964 F. J. LYNCH 3,139,317
BONDING CLAMP FOR PIPES
Filed June 4, 1962 2 Sheets-Sheet 1

INVENTOR.
FRANCIS J. LYNCH
BY George L. Church
ATTORNEY

INVENTOR.
FRANCIS J. LYNCH
BY George L. Church
ATTORNEY

June 30, 1964     F. J. LYNCH     3,139,317
BONDING CLAMP FOR PIPES

Filed June 4, 1962     2 Sheets-Sheet 2

INVENTOR.
ATTORNEY

United States Patent Office 3,139,317
Patented June 30, 1964

3,139,317
BONDING CLAMP FOR PIPES

Francis J. Lynch, Radnor, Pa., assignor to Sun Oil Company, Philadelphia, Pa., a corporation of New Jersey Filed June 4, 1962, Ser. No. 199,905
3 Claims. (Cl. 339—251)

This invention relates to a bonding clamp for pipes, and more particularly to a readily-applicable and readily-removable clamp for electrically connecting a bonding cable or wire to a pipe, in a temporary manner. Although not limited thereto, the bonding clamp of the invention will be described as a pipeline accessory, for providing electrical bonding from one end to the other of a section of pipeline within which repair or other work is to be carried on.

Buried pipelines invariably carry electrical currents, which in some cases may be quite large. For these currents, it is desirable that the electrical continuity of the line be maintained during the performance of work that involves cutting or un-flanging of the line. The maintenance of such continuity is essential for lines carrying fluid hydrocarbons, in order to prevent arcing in an invariably explosive environment.

According to prior practice, the effecting of this electrical continuity has been attempted by the use of screw-type clamps of various kinds, with one such clamp at each end of the section of line to be worked on, plus a wire or cable the ends of which are connected, by means of screw connectors, to the respective clamps. Arrangements of this sort very often leave something to be desired in the way of effectiveness, reliability, etc. Very often, the various screws are either under-tightened (in which case the desired, low resistance electrical contact is not provided) or over-tightened (in which case the pipeline may be damaged).

An object of this invention is to provide a novel bonding clamp for pipes.

Another object is to provide a bonding clamp assembly which does not employ any screw clamps or screw connectors.

A further object is to provide a bonding clamp for a pipe, characterized in that the contact member of the clamp is applied to the pipe with a predetermined or preset force, irrespective of the manner in which the clamp is applied and irrespective of the particular person who is applying the clamp.

A still further object is to provide a bonding clamp for a pipe which can be applied to the pipe by manual manipulations alone, without utilizing any tools whatever.

The objects of this invention are accomplished, briefly, in the following manner: A yoke member, constituting part of the bonding clamp assembly, is releasably fastened in position on the pipe by means of a length of flexible chain which passes around the pipe and is releasably coupled to such yoke. A pivotally-mounted handle is operatively coupled to the chain and to the yoke, in such a way as to cause tightening of the chain (and thereby also of the yoke) on the pipe, when the handle is manipulated. A metallic bridge member is coupled to the yoke by means of a spring-and-piston construction, the arrangement here being such that the only force urging the bridge toward the pipe is that developed by the spring. The bridge straddles the yoke and carries four hardened steel tips which make electrical contact with the pipe. One end of a bonding wire or cable is electrically connected to the bridge, and in order to provide a complete bonding unit, the other end of this wire is electrically connected to the bridge of a duplicate bonding clamp assembly.

A detailed description of the invention follows, taken in conjunction with the accompanying drawings, wherein.

Figure 1:
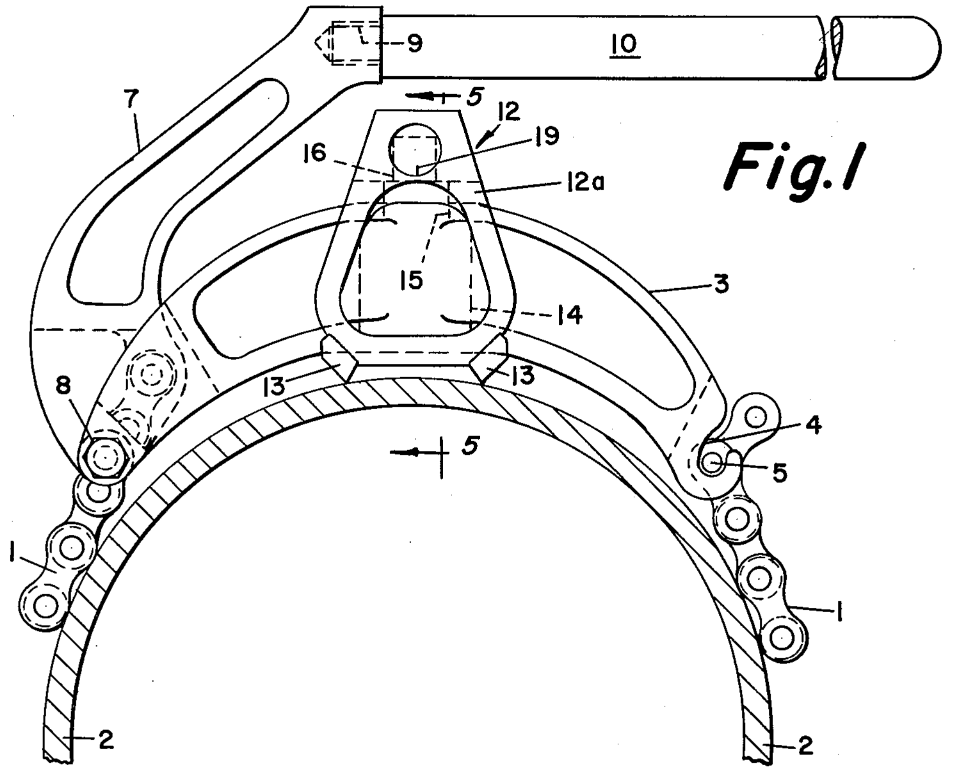
FIG. 1 is an elevation or front view of the device of the invention, shown in operative position on a pipe.

Referring now to the drawings, a length 1 of flexible metallic roller chain is arranged to secure the bonding clamp assembly of this invention in position on the outside of a pipe 2. Chain 1 passes circumferentially around the pipe 2 and has an effective length appropriate to the diameter of the pipe on which the clamp is to be used, the effective length of the chain being less than the circumference of such pipe. By way of example, for a 6" diameter pipe the effective length of the chain (what is meant by this will be explained hereinafter) would be twenty-two links, for an 8" diameter pipe this length would be thirty-one links, while for a 14" diameter pipe this length would be fifty-five links. The chain 1, being flexible and being adapted to pass around the outside of a circular pipe, may be thought of as a flexible band.

An elongated yoke member 3, of more or less arcuate outer configuration in elevation (see FIG. 1) but substantially rectangular in plan view (see FIG. 2), is bifurcated at its two ends, the bifurcated length at one end of the yoke being considerably in excess of that at the other end. At the shorter-bifurcated end (the right-hand end in FIGS. 1 and 2), each of the two arms of yoke 3 provided by the bifurcation has cut therein a slot 4, of generally arcuate configuration and opening outwardly. The yoke terminates in a hook-like shape which forms one side of the slots 4. The two slots 4 are aligned, front-to-rear (see FIG. 2). Chain 1 has secured thereto, in alignment with one of the rivets which fasten two adjacent links of the chain together, a pin 5 which extends laterally outwardly for some distance on both sides of the chain. Pin 5 has a diameter such as to seat in slots 4, with the main body of the chain passing freely through the space between the two yoke arms at the bifurcation. The location of pin 5 establishes one end of the effective length of chain 1. It will be realized that pin 5 is readily insertable into, and removable from, the aligned slots 4, by way of the open upper ends of these slots.

Figure 2:
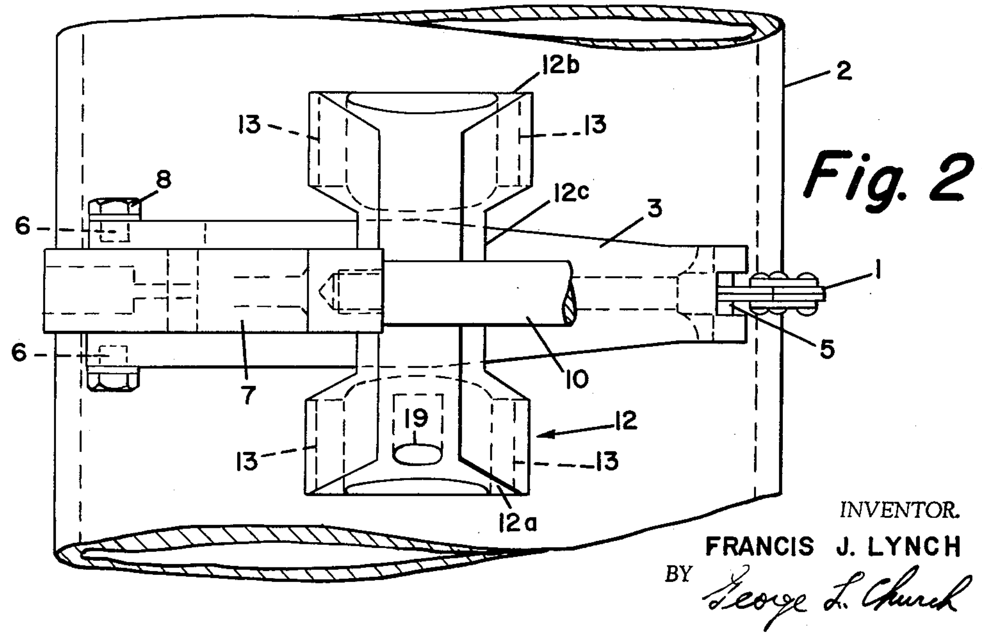
FIG. 2 is a plan or top view of the device.

At the longer-bifurcated end (the left-hand end in FIGS. 1 and 2), each of the two arms of yoke 3 provided by the bifurcation has a hole 6 drilled therethrough, these two holes being aligned, front-to-rear (see FIG. 2). Each hole 6 extends from the outside of the respective arm entirely through the same, to the space between the two yoke arms at the bifurcation. The holes 6 are each threaded or tapped for about three-fourths of their length, measured from the outside of the arms toward the inter-arm space, and the remaining one-fourth of the length of each hole is of smaller diameter.

A handle 7, which is bifurcated at its lower end, has this lower end positioned within the space between the two arms of yoke 3, at the left-hand bifurcation thereof. Handle 7 is pivotally connected to yoke 3, at the lower end of the handle and at the left-hand end of yoke 3. This pivotal connection is effected by means of two aligned pivot pins 8 which thread into the tapped portions of the respective holes 6 and which extend freely into respective aligned holes provided in the bifurcated arms of handle 7. The heads of pins 8 come into engagement with the outer side faces of the arms of yoke 3, a lock washer being interposed between each head and the respective yoke side face, as illustrated in FIG. 2.

As illustrated in FIG. 1, one end of handle 7 is positioned within the space between the arms of the bifurcated yoke 3, and the body of this handle extends upwardly (out of the inter-arm yoke space), and then toward the right, generally in the direction of the opposite end of the yoke. At its free (or upper) end, handle 7 has a tapped hole 9 into which is threaded one end of a handle bar 10, made of stainless steel for example, which provides a grippable lever for proper manual operation of the handle.

The end link of chain 1 remote from pin 5 has, like all of the other links of this chain, a transverse hole, but this end link is devoid of any rivet. An over-center arrangement is provided at this end of this chain, for enabling the chain 1 (and with it the yoke 3, as well as other elements to be described hereinafter) to be tightened around the pipe 2, by actuation of handle bar 10 and handle 7. The end of chain 1 remote from pin 5 extends between the two handle arms at the bifurcated end of handle 7, this end extending beyond pivot pins 8, generally in the direction of the remote or opposite end of yoke 3. The end link of chain 1 (having a transverse hole, as aforesaid) is secured to the lower end of handle 7 (see FIG. 3) by means of a pin 11 whose ends are secured (as by swaging) in a pair of aligned holes in the bifurcated handle arms and the center portion of which passes through the hole in the end link of chain 1. It is intended that the connection of one end of chain 1 to handle 7 (by means of the pin 11, as described) be a permanent one.

By rotating handle 7 (by means of handle bar 10) counterclockwise from its position as illustrated in FIG. 1, the chain 1 is slackened sufficiently so that the free end thereof can be passed down under pipe 2 and brought up to position chain pin 5 within yoke grooves 4. Then, by rotating handle bar 10 and handle 7 clockwise, the pin 11 is rotated similarly, tightening the chain 1 around pipe 2. This moves yoke 3 toward pipe 2.

The effective length of chain 1 is the length thereof between the hole in the end link (which hole is engaged by pin 11, in the manner aforesaid) and the pin 5 (which in the operative position of the clamp is positioned in yoke grooves 4, as aforesaid).

Figures 3, 4, 5:
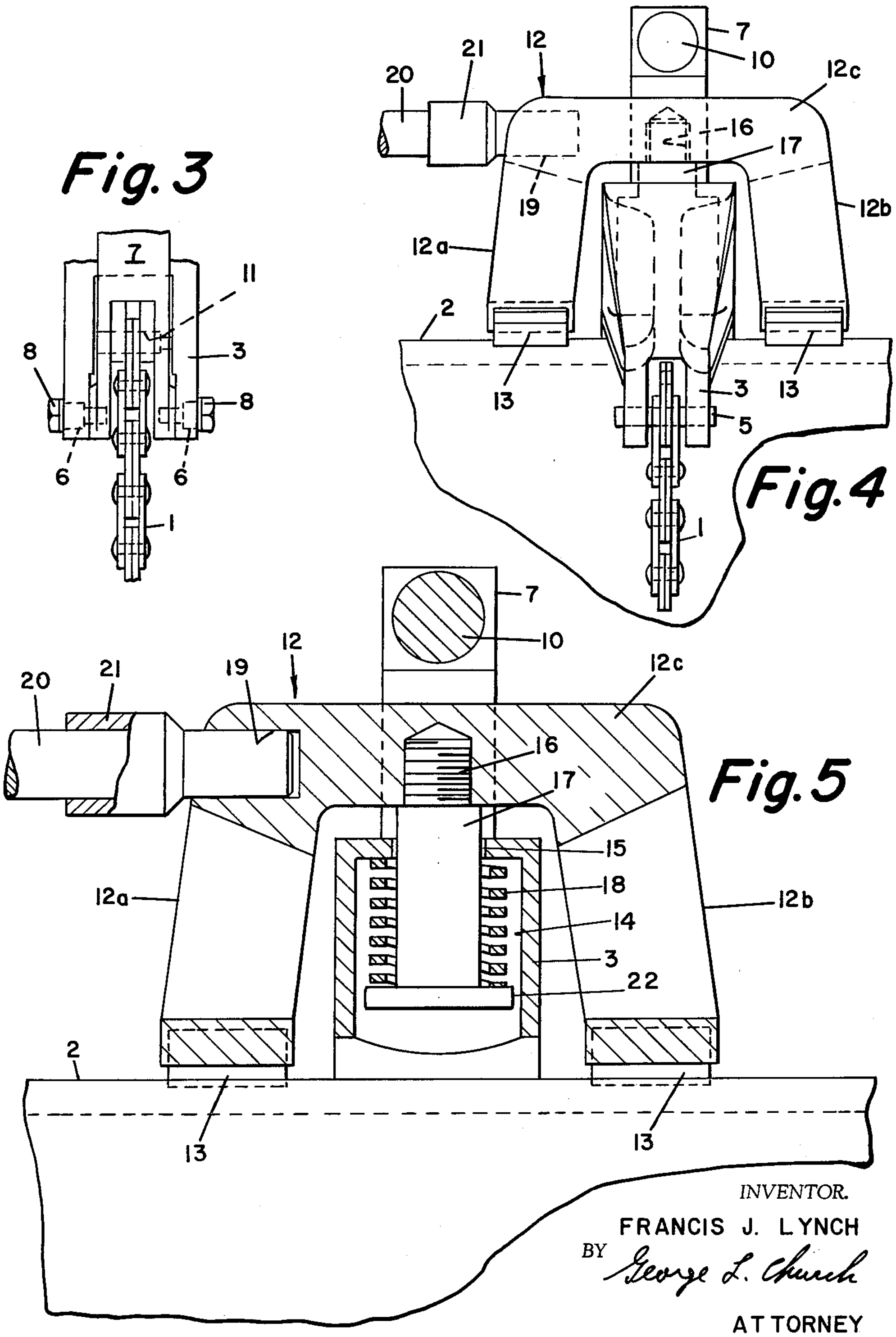
FIG. 3 is a partial side view of the device, looking at the left-hand side of FIG. 1, the bridge being omitted.
FIG. 4 is a partial side view of the device, looking at the right-hand side of FIG. 1.
FIG. 5 is a sectional view taken on line 5—5 of FIG. 1.

A bridge member 12, having two spaced end faces 12*a* and 12*b* of more or less triangular configuration (see FIG. 1) integrally joined at their upper ends by a horizontally-extending intermediate spanning portion 12*c*, straddles yoke 3 (see FIGS. 2 and 4). That is to say, the spanning portion 12*c* of the bridge extends over the upper face of yoke 3, in spaced relation thereto and in a direction generally at right angles to the length of this yoke, while the end faces 12*a* and 12*b* of the bridge extend down more or less parallel to the respective side faces of the yoke but in spaced relation thereto (see FIG. 4).

Bridge 12 is metallic and is made from a material having good electrical conductivity, e.g. the material known as "Atlas A Bronze." Each of the two lower corners of each of the two triangular end faces 12*a* and 12*b* (i.e., a total of four corners) of the bridge carries a respective hardened steel (e.g., carbide steel) insert 13. These inserts are firmly secured (as by welding) to the respective corners. The length of each of the inserts 13 is approximately the same as the depth of the corresponding end face 12*a* or 12*b* (see FIG. 4), and each of the inserts is of substantially rectangular cross-section and is mounted somewhat diagonally on the respective bridge end face (see FIG. 1), so that one edge of each insert is adapted to engage the surface of the pipe.

The arrangement for coupling bridge 12 to yoke 3 will now be described, with reference to FIG. 5. Yoke 3, which is largely of webbed construction, has in its central portion a boss which is bored from the bottom side to provide a cylindrical chamber 14 opening downwardly and closed at its upper end by a wall formed by the material of the yoke. An elliptical aperture 15, slightly elongated in the direction of the length of the yoke, of considerably smaller size than the diameter of chamber 14, and centered on the axis of this chamber, is drilled through the upper end wall of the chamber. A tapped hole 16, opening downwardly, is provided in spanning portion 12*c* of the bridge, at the center of this portion.

A piston member 17 has an enlarged head at its lower end, an intermediate shank portion of somewhat smaller diameter, and an upper or tipped portion which is threaded with a still smaller diameter. The diameter of the piston head is such that it can fit within chamber 14, and the diameter of the piston shank portion is such that it can extend freely through aperture 15. Piston 17 is positioned within chamber 14, with its shank portion passing through aperture 15 and its threaded tip screwed tightly into tapped hole 16 of the bridge. Thus, piston 17 is rigidly secured to bridge 12.

A helical or coil spring 18, formed from rectangular stock and originally under considerable compression so as to be substantially shorter than its free length, is positioned in chamber 14, one end of this spring bearing against the upper side of the head of piston 17 and the other (or upper) end of spring 18 bearing against the upper end closure of chamber 14. Thus, the lower end of spring 18 engages the bridge 12 (since this end engages the piston 17, which latter is rigidly fastened to the bridge), and the upper end of this spring directly engages yoke 3. The only coupling between the yoke and the bridge, therefore, is by way of spring 18. The compression of spring 18, and thus the predetermined operative force of this spring, is determined by the length of the shank portion of piston 17; by machining the upper end face of this shank, a limited amount of adjustment of the spring force is possible.

Spring 18 is under a predetermined compressive force, as previously stated. After the chain pin 5 has been positioned in yoke grooves 4, with the chain around pipe 2, handle bar 10 (and thereby also handle 7) is rotated clockwise to tighten chain 1 around the pipe and to move yoke 3 toward the pipe, as previously stated. This movement of the yoke is effective on the upper end of spring 18 (which upper end bears against the yoke, as previously described), moving this upper end of the spring downwardly and allowing the lower end of the spring to push piston 17 and bridge 12 (to which the piston is fastened) downwardly toward the pipe 2, but only with the predetermined operative force of the spring, since the coupling between yoke 3 and bridge 12 is only by way of spring 18. Therefore, the force which urges bridge 12 downwardly toward the pipe (and inserts 13 against the pipe) is governed solely by the predetermined effective force of spring 18, and this even though handle bar 10 may be pushed downwardly (or clockwise) with an excessive force. As a result, the pipe 2 will not be damaged; at the same time, the force urging bridge 12 against the pipe (i.e., the predetermined operative force exerted by spring 18) is sufficient to provide good electrical contact between inserts 13 (and also, of course, bridge 12) and the pipe. This is an important feature of the invention.

The periphery of the head of piston 17, rather than being cylindrical, has a rounded, hemispherical configuration, as illustrated at 22 (FIG. 5). This allows for or accommodates the "rocking" action of yoke 3 which takes place during the application operation just described.

In order to electrically connect a bonding (or grounding) cable to the bonding clamp of this invention, and thereby also to the pipe, bridge 12 is provided with a hole or bore 19, in which one end of a wire or cable 20 (see FIG. 4) is adapated to be soldered by means of a brass ferrule 21 which has been previously soldered to the end of the cable. In this manner, one end of the bonding cable or wire 20 (which may be on the order of twenty-five feet in length, for example) is electrically connected to bridge 12; it will be remembered that the bridge itself makes good electrical contact with the pipe 2, by means of the hardened inserts 13. To complete a bonding unit, the other end of cable 20 would be soldered to the bridge member of a bonding clamp which is an exact duplicate of the one described hereinabove.

It may be seen, from the foregoing description, that no screw clamps or screw connectors are utilized in the device of this invention. The bonding clamp is secured to the pipe by means of a yoke-and-chain construction, while the cable is electrically connected to the clamp by means of a soldered connection.

No screwdrivers or other tools are required for application of the clamp to the pipe.

It may be desirable to provide some sort of catch or lock (not shown) for the handle bar 10, by means of which it may be releasably locked in the operated position illustrated in the drawings; this will prevent accidental release of the bonding clamp while the same is in use.

For convenience in use of the device, one end of a bat-like handle (not shown) may be pivotally or rigidly secured (e.g., by means of a pin or screw) to the free end of the chain 1. Such a handle may be easily grasped, and it will greatly facilitate the insertion of this end of the chain (carrying pin 5) into the slots 4 of yoke 3.

The invention claimed is:

1. A bonding clamp for pipes comprising a flexible band adapted to pass around the outside of a pipe, the effective length of said band being less than the circumference of said pipe, an elongated arcuate yoke member adapted to be coupled at one end thereof to one end of said band, a handle attached to the other end of said band, means pivotally connecting said handle to the opposite end of said yoke member in an over-center arrangement relative to the point of attachment of said handle to said band, said yoke member conforming approximately to the outer surface of the pipe but being spaced therefrom when said clamp is in operative position on a pipe; a bridge member adapted to make electrical contact with the outside of said pipe, and means coupling said bridge member to said yoke member intermediate the ends thereof, said last-mentioned means comprising a compression spring one end of which acts on said yoke member and the other end of which acts on said bridge member.

2. A clamp in accordance with claim 1, wherein said bridge member is arched, spans said yoke member, and is adapted to make contact with the outside of said pipe at points located on opposite sides of said yoke member.

3. A clamp as defined in claim 1, wherein said spring urges said bridge member toward said pipe with a predetermined force when said clamp is in operative position on such pipe.

References Cited in the file of this patent

UNITED STATES PATENTS

| | | |
|---|---|---|
| 1,675,163 | Colburn | June 26, 1928 |
| 1,932,602 | Ratta | Oct. 31, 1933 |
| 1,966,132 | Pearson | July 10, 1934 |
| 2,281,366 | Metcalf | Apr. 28, 1942 |
| 2,629,002 | Tinker | Feb. 17, 1953 |
| 2,632,068 | Froebel et al. | Mar. 17, 1953 |
| 2,834,950 | Haulton | May 13, 1958 |
| 2,858,518 | Chrystie et al. | Oct. 28, 1958 |
| 3,013,241 | Wing | Dec. 12, 1961 |